United States Patent
Yoon et al.

(10) Patent No.: US 9,165,715 B2
(45) Date of Patent: Oct. 20, 2015

(54) MULTILAYER CERAMIC CAPACITOR WITH ELECTRODES HAVING LEAD-OUT PARTS AND METHOD OF MANUFACTURING THE SAME

(71) Applicant: SAMSUNG ELECTRO-MECHANICS CO., LTD., Suwon, Gyunggi-do (KR)

(72) Inventors: Byung Kwon Yoon, Gyunggi-do (KR); Jae Yeol Choi, Gyunggi-do (KR); Sang Hyuk Kim, Gyunggi-do (KR)

(73) Assignee: SAMSUNG ELECTRO-MECHANICS CO., LTD., Suwon, Gyunggi-Do (KR)

( * ) Notice: Subject to any disclaimer, the term of this patent is extended or adjusted under 35 U.S.C. 154(b) by 120 days.

(21) Appl. No.: 13/739,739

(22) Filed: Jan. 11, 2013

(65) Prior Publication Data

US 2014/0160618 A1    Jun. 12, 2014

(30) Foreign Application Priority Data

Dec. 10, 2012    (KR) .......................... 10-2012-0142925

(51) Int. Cl.
*H01G 4/12*    (2006.01)
*H01G 4/30*    (2006.01)
(Continued)

(52) U.S. Cl.
CPC ................. *H01G 4/12* (2013.01); *H01G 4/012* (2013.01); *H01G 4/232* (2013.01); *H01G 4/30* (2013.01); *Y10T 29/417* (2015.01)

(58) Field of Classification Search
CPC ........... H01G 4/005; H01G 4/30; H01G 4/12; H01G 4/232

USPC ................. 361/306.3, 304, 321.2, 303, 321.3
See application file for complete search history.

(56) References Cited

U.S. PATENT DOCUMENTS

| | | | |
|---|---|---|---|
| 4,771,520 A * | 9/1988 | Tanaka et al. ................. | 29/25.42 |
| 7,054,134 B2 * | 5/2006 | Togashi et al. ............. | 361/301.4 |
| 2010/0206624 A1 * | 8/2010 | Feichtinger ................... | 174/260 |

(Continued)

FOREIGN PATENT DOCUMENTS

| | | | |
|---|---|---|---|
| JP | 09260201 A | * | 10/1997 |
| JP | 10-289837 A | | 10/1998 |
| JP | 2002208533 A | * | 7/2002 |

(Continued)

OTHER PUBLICATIONS

Notice of Office Action Japanese Patent Application No. 2013-003215 dated Oct. 22, 2013 with English translation.

*Primary Examiner* — David M Sinclair
(74) *Attorney, Agent, or Firm* — McDermott Will & Emery LLP

(57) ABSTRACT

There is provided a multilayer ceramic capacitor including: a ceramic body in which a plurality of dielectric layers are stacked; a plurality of first and second internal electrodes alternately formed on the plurality of dielectric layers and including first and second lead-out parts having an overlap area exposed to one surface of the ceramic body, respectively; first and second external electrodes formed on one surface of the ceramic body and electrically connected to the first and second lead-out parts, respectively; and a first insulating layer formed on one surface of the ceramic body to cover exposed portions of the first and second lead-out parts, wherein the first and second lead-out parts are formed to have concave-convex portions alternating with each other in the overlap area therebetween.

15 Claims, 5 Drawing Sheets

(51) Int. Cl.
*H01G 4/012* (2006.01)
*H01G 4/232* (2006.01)

(56) References Cited

U.S. PATENT DOCUMENTS

2012/0127626 A1   5/2012   Chang et al.

FOREIGN PATENT DOCUMENTS

| | | |
|---|---|---|
| JP | 2005-327999 A | 11/2005 |
| JP | 2008-258481 A | 10/2008 |
| JP | 2009-026872 A | 2/2009 |
| JP | 2009-054973 A | 3/2009 |
| KR | 10-1141417 B1 | 5/2012 |

* cited by examiner

MULTILAYER CERAMIC CAPACITOR WITH ELECTRODES HAVING LEAD-OUT PARTS AND METHOD OF MANUFACTURING THE SAME

CROSS-REFERENCE TO RELATED APPLICATIONS

This application claims the priority of Korean Patent Application No. 10-2012-0142925 filed on Dec. 10, 2012, in the Korean Intellectual Property Office, the disclosure of which is incorporated herein by reference.

BACKGROUND OF THE INVENTION

1. Field of the Invention

The present invention relates to a multilayer ceramic capacitor and a method of manufacturing the same.

2. Description of the Related Art

In general, electronic components using a ceramic material include capacitors, inductors, piezoelectric elements, varistors, thermistors, and the like.

Among ceramic electronic components, a multilayer ceramic capacitor (MLCC) is an electronic component having advantages such as compactness, high capacitance, and ease of mounting.

The multilayer ceramic capacitor is a chip shaped condenser that is mounted on circuit boards of various electronic products such as display devices, such as liquid crystal displays (LCDs), plasma display panels (PDPs), and the like, computers, personal digital assistants (PDAs), mobile phones, and the like, and serves to charge electricity or discharge electricity.

The multilayer ceramic capacitor may include a plurality of dielectric layers, internal electrodes disposed to face each other, having the dielectric layer interposed therebetween, and external electrodes electrically connected to the internal electrodes.

Recently, as electronic products have been gradually miniaturized, microminiaturization and the implementation of super high capacitance in the multilayer ceramic capacitors used in the electronic products have been required.

Therefore, a ceramic capacitor, in which thicknesses of the dielectric layers and the internal electrodes are thin for microminiaturization of the product and the number of stacked dielectric layers is increased for super high capacitance, has been manufactured, but there was a limitation in increasing the capacitance of the product with only this configuration.

A multilayer ceramic capacitor having a structure, in which an overlap area between the internal electrodes is increased in order to increase capacitance of the product, and lead-out parts of the internal electrodes are exposed to the same surface of a ceramic body, for example, a lower surface of the ceramic body to thereby allow the lower surface of the capacitor to be a mounting surface, has been disclosed.

However, in the case of the multilayer ceramic capacitor using the lower surface as the mounting surface, defects due to lateral displacement in the overlap area between the internal electrodes at the time of cutting, or the like, may occur, and the inter-layered internal electrodes may be connected to each other, and thus, it is likely that the possibility of short circuits is increased.

A structure in which lead-out parts of internal electrodes are exposed to the same surface of a substrate is disclosed in the following Patent Document 1, but a structure in which first and second lead-out parts are formed to have concave-convex portions alternating with each other in an overlap area therebetween is not disclosed therein.

A structure in which edges of first and second internal electrodes have bent portions, and the internal electrodes are alternately exposed through both end surfaces of a ceramic body is disclosed in the following Patent Document 2.

RELATED ART DOCUMENT (Patent Document 1) Japanese Patent Laid-open Publication No. 1998-289837
(Patent Document 2) Korean Patent No. 1141417

SUMMARY OF THE INVENTION

An aspect of the present invention provides a capacitor and a method of manufacturing the same, capable of increasing capacitance and using a lower surface of the capacitor as a mounting surface, by increasing an overlap area between internal electrodes and allowing the internal electrodes to have lead-out parts exposed in a single direction. In addition, an overlap area in exposed portions of the internal electrodes is reduced by being formed to have concave-convex portions, so that defects due to lateral displacement between the internal electrodes at the time of cutting, or the like, may be prevented and a possibility of short circuits may be reduced.

According to an aspect of the present invention, there is provided a multilayer ceramic capacitor including: a ceramic body in which a plurality of dielectric layers are stacked; a plurality of first and second internal electrodes alternately formed on the plurality of dielectric layers and including first and second lead-out parts having an overlap area exposed to one surface of the ceramic body, respectively; first and second external electrodes formed on one surface of the ceramic body and electrically connected to the first and second lead-out parts, respectively; and a first insulating layer formed on one surface of the ceramic body to cover exposed portions of the first and second lead-out parts, wherein the first and second lead-out parts are formed to have concave-convex portions alternating with each other in the overlap area therebetween.

The concave-convex portions in the overlap area between the first and second lead-out parts may be one of triangular concave-convex portions, trapezoidal concave-convex portions, and semicircular concave-convex portions.

A length of the overlap area between the first and second lead-out parts may be 5% to 85% of a length of the ceramic body.

The first insulating layer may be formed on one surface of the ceramic body to entirely cover the exposed portions of the first and second lead-out parts.

The first and second internal electrodes may have third and fourth lead-out parts exposed to the other surface of the ceramic body opposing one surface of the ceramic body, respectively, the third and fourth lead-out parts may have an overlap area, and the third and fourth lead-out parts may be formed to have concave-convex portions alternating with each other in the overlap area therebetween.

The concave-convex portions in the overlap area between the third and fourth lead-out parts may be one of triangular concave-convex portions, trapezoidal concave-convex portions, and semicircular concave-convex portions.

A length of the overlap area between the third and fourth lead-out parts is 5% to 85% of a length of the ceramic body.

The other surface of the ceramic body may be provided with a second insulating layer so as to entirely cover exposed portions of the third and fourth lead-out parts.

According to another aspect of the present invention, there is provided a method of manufacturing a multilayer ceramic capacitor, the method including: forming a first internal electrode on a first ceramic sheet while allowing a first lead-out part to be exposed to one surface of the first ceramic sheet; forming a second internal electrode on a second ceramic sheet while allowing a second lead-out part having a overlap area with the first lead-out part to be exposed to one surface of the second ceramic sheet; forming a ceramic body by alternately stacking a plurality of first and second ceramic sheets having the first and second internal electrodes formed thereon and sintering the stacked sheets; forming first and second external electrodes on one surface of the ceramic body so as to be electrically connected to the first and second lead-out parts, respectively; and forming a first insulating layer on one surface of the ceramic body so as to cover exposed portions of the first and second lead-out parts, wherein the first and second lead-out parts are formed to have concave-convex portions alternating with each other in the overlap area therebetween.

In the forming of the first and second internal electrodes, the concave-convex portions in the overlap area between the first and second lead-out parts may be one of triangular concave-convex portions, trapezoidal concave-convex portions, and semicircular concave-convex portions.

In the forming of the first insulating layer, the first insulating layer may be formed by applying ceramic slurry to one surface of the ceramic body so as to entirely cover the exposed portions of the first and second lead-out parts.

In the forming of the first and second internal electrodes, the first and second internal electrodes may have third and fourth lead-out parts exposed to the other surface of the ceramic body opposing one surface of the ceramic body, respectively, the third and fourth lead-out parts may have an overlap area, and the third and fourth lead-out parts may be formed to have concave-convex portions alternating with each other in the overlap area therebetween.

The concave-convex portions in the overlap area between the third and fourth lead-out parts may be one of triangular concave-convex portions, trapezoidal concave-convex portions, and semicircular concave-convex portions.

The method may further include forming a second insulating layer on the other surface of the ceramic body so as to entirely cover exposed portions of the third and fourth lead-out parts.

In the forming of the second insulating layer, the second insulating layer may be formed by applying ceramic slurry to the other surface of the ceramic body so as to entirely cover the exposed portions of the third and fourth lead-out parts.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
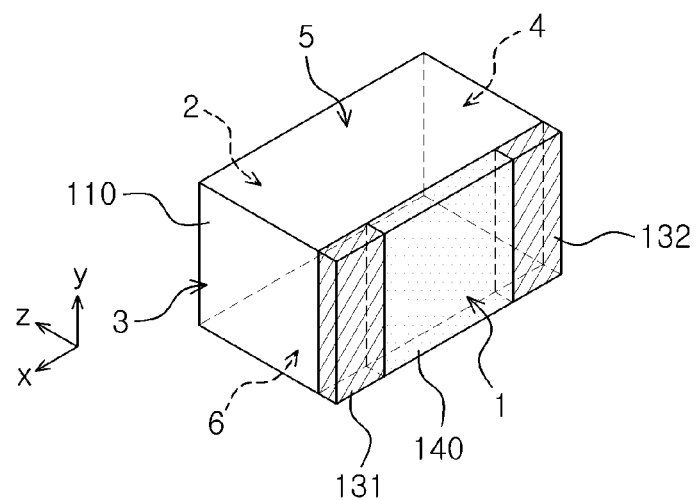
FIG. 1 is a transparent perspective view schematically showing a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
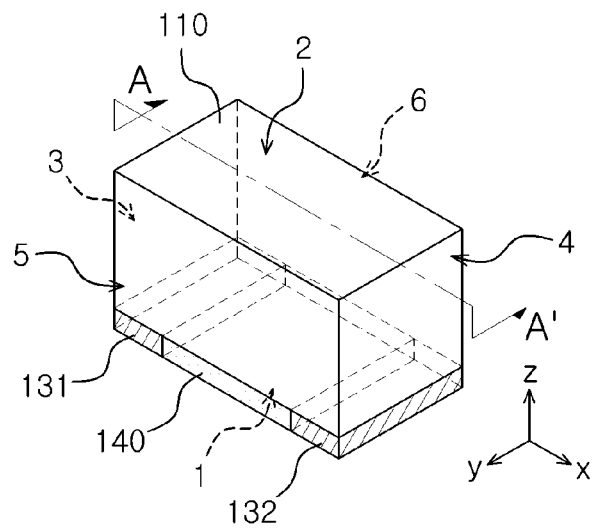
FIG. 2 is a transparent perspective view showing the multilayer ceramic capacitor of FIG. 1 in a direction in which the capacitor is mounted.
Figure 3:
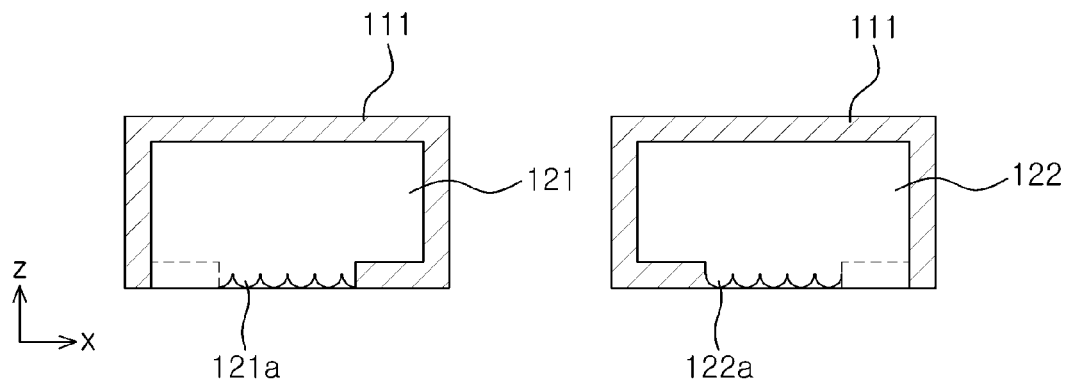
FIG. 3 is a transversal cross-sectional view showing first and second internal electrodes of the multilayer ceramic capacitor of FIG. 1.
Figure 4:
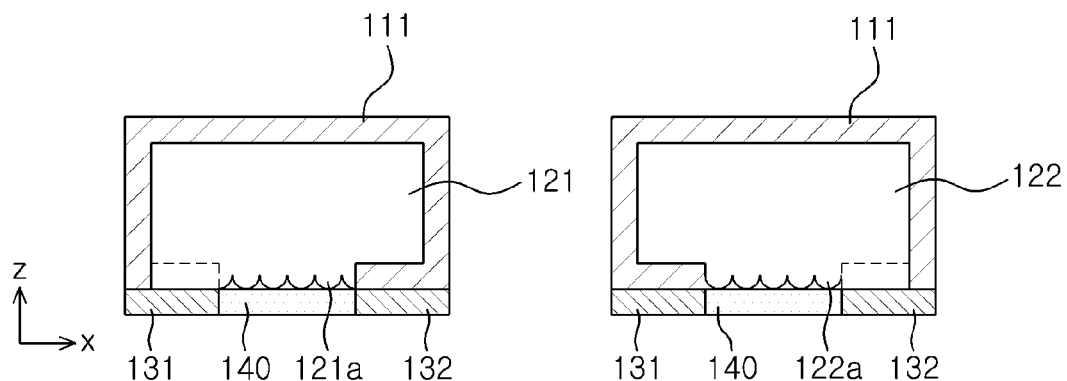
FIG. 4 is a transversal cross-sectional view showing a structure in which first and second external electrodes and a first insulating layer are formed on the first and second internal electrodes of FIG. 3.
Figure 5:
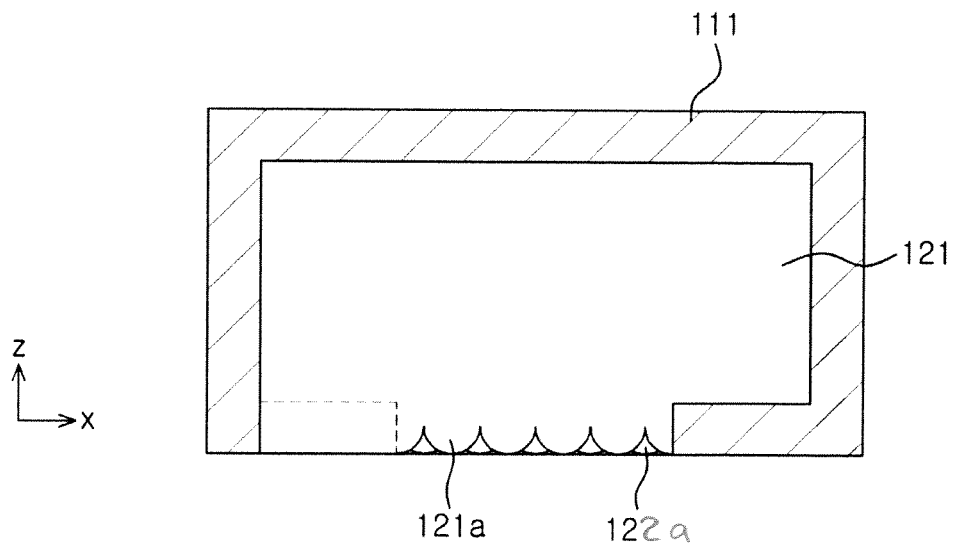
FIG. 5 is a transversal cross-sectional view showing a structure in which the first and second internal electrodes of FIG. 3 are stacked in a y-direction.
Figure 6:
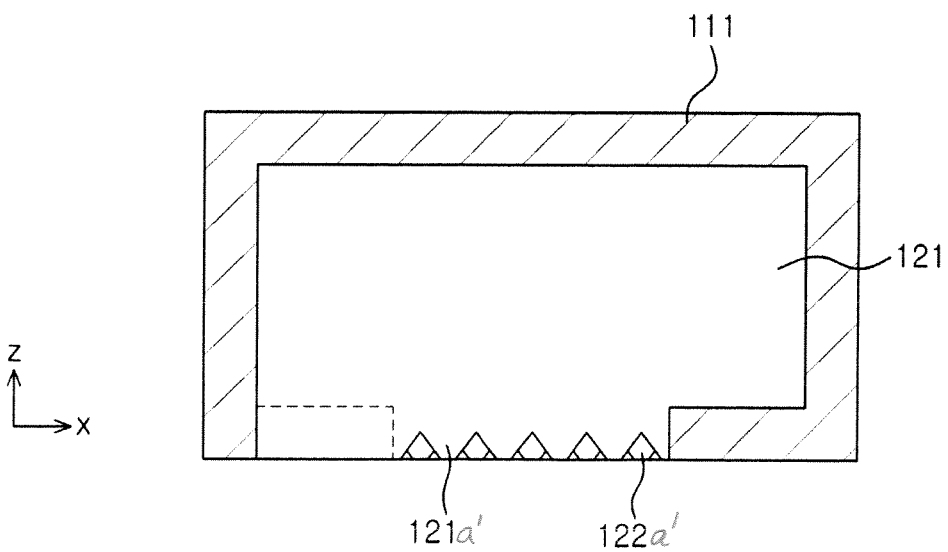
FIG. 6 is a transversal cross-sectional view showing another example of first and second lead-out parts having concave-convex shapes in the multilayer ceramic capacitor of FIG. 3.
Figure 7:
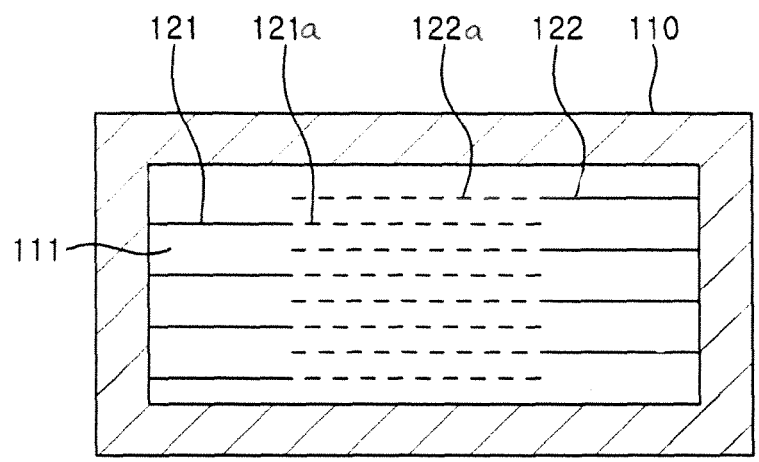
FIG. 7 is a longitudinal cross-sectional view of FIG. 2.

FIG. 1 is a transparent perspective view schematically showing a multilayer ceramic capacitor according to an embodiment of the present invention; FIG. 2 is a transparent perspective view showing the multilayer ceramic capacitor of FIG. 1 in a direction in which the capacitor is mounted; FIG. 3 is a transversal cross-sectional view showing first and second internal electrodes of the multilayer ceramic capacitor of FIG. 1; FIG. 4 is a transversal cross-sectional view showing a structure in which first and second external electrodes and a first insulating layer are formed on the first and second internal electrodes of FIG. 3; FIG. 5 is a transversal cross-sectional view showing a structure in which the first and second internal electrodes of FIG. 3 are stacked in a y-direction; FIG. 6 is a transversal cross-sectional view showing another example of first and second lead-out parts having concave-convex shapes in the multilayer ceramic capacitor of FIG. 3; and FIG. 7 is a longitudinal cross-sectional view of FIG. 2.

According to the embodiment of the present invention, an x-direction refers to a direction in which first and second external electrodes 131 and 132 are formed, having a predetermined interval therebetween; a y-direction refers to a direction in which first and second internal electrodes 121 and 122 are stacked, having a dielectric layer 111 therebetween; and a z-direction refers to a width direction of a ceramic body 110 in which first and second lead-out parts 121a and 122a of the first and second internal electrodes 121 and 122 are exposed.

Referring to FIGS. 1 through 7, a multilayer ceramic capacitor 100 according to the embodiment of the present invention may include the ceramic body 110, the first and second internal electrodes 121 and 122 formed in the ceramic body 110, and the first and second external electrodes 131 and 132 and an insulating layer 140 formed on one surface of the ceramic body 110.

According to the present embodiment, the ceramic body 110 may have first and second surfaces 1 and 2 opposing each other, and third to six surfaces 3 to 6 connecting the first and second surfaces 1 and 2 to each other. According to the embodiment of the present invention, the first surface 1 of the ceramic body 110 may be a mounting surface disposed on a mounting area of a circuit board.

A shape of the ceramic body 110 is not particularly limited, but the ceramic body 110 may have a rectangular parallelepiped shape having the first to sixth surfaces 1 to 6. Further, a size of the ceramic body 110 is not particularly limited. For example, the ceramic body 110 may have a size of 1.0 mm×0.5 mm, thereby forming a multilayer ceramic capacitor having high capacitance.

The ceramic body 110 may be formed by stacking a plurality of dielectric layers 111 and then sintering the stacked dielectric layers 111. Here, the plurality of dielectric layers 111 forming the ceramic body 110 may be integrated in a sintered state such that a boundary therebetween may not be clearly discernible.

The dielectric layers 111 may be formed by sintering ceramic green sheets including a ceramic powder, an organic solvent, and an organic binder. The ceramic powder is a material having a high K-dielectric constant (or high permittivity), and as the ceramic powder, for example, a barium titanate ($BaTiO_3$)-based material, a strontium titanate ($SrTiO_3$)-based material, or the like, may be used. However, the ceramic powder is not limited thereto.

The first and second internal electrodes 121 and 122 are formed on a plurality of ceramic sheets forming the dielectric layers 111 and are alternately stacked in the y-direction of the ceramic body 110. Here, the first and second internal electrodes 121 and 122 may be disposed to face each other, having one dielectric layer 111 interposed therebetween.

The first and second internal electrodes 121 and 122 may be electrically insulated from each other by the dielectric layer 111 interposed therebetween. According to the embodiment of the present invention, the first and second internal electrodes 121 and 122 may be disposed vertically with respect to the mounting surface, that is, the first surface 1, of the multilayer ceramic capacitor.

The first and second internal electrodes 121 and 122 may be formed by printing a conductive paste including a conductive metal on at least one surface of the dielectric layers 111. Here, the conductive metal may be Ni, Cu, Pd, or an alloy thereof, but is not limited thereto. In addition, as a printing method of the conductive paste, a screen printing method, a gravure printing method, or the like, may be used, but the present invention is not limited thereto.

According to the embodiment of the present invention, the first and second internal electrodes 121 and 122 may have the first and second lead-out parts 121a and 122a exposed to the first surface 1 of the ceramic body 110 in order to be connected to the first and second external electrodes 131 and 132 having different polarities, respectively.

According to the embodiment of the present invention, the first and second lead-out parts 121a and 122a may refer to areas of a conductive pattern forming the first and second internal electrodes 121 and 122, the area having an increased width in the conductive pattern to be exposed to the first surface 1 of the ceramic body 110.

Generally, a multilayer ceramic capacitor may form capacitance in an overlap area of first and second internal electrodes, and first and second lead-out parts connected to first and second external electrodes having different polarities do not have an overlap area.

However, according to the embodiment of the present invention, the first and second lead-out parts 121a and 122a may have an overlap area. That is, the first and second lead-out parts 121a and 122a may be exposed to the first surface 1, and the exposed portions thereof may be partially overlapped with each other, whereby the capacitance of the capacitor may be increased.

In views disposed leftward of FIGS. 3 and 4, the first internal electrode 121 that is not overlapped with the second internal electrode 122 is represented by a dotted line, and in views disposed rightward of FIGS. 3 and 4, the second internal electrode 122 that is not overlapped with the first internal electrode 121 is represented by a dotted line.

In this case, the first lead-out parts 121a and 121a' and second lead-out arts 122a and 122a' may be formed to have any one of various concave-convex portions, such as triangular concave-convex portions, trapezoidal concave-convex portions, semicircular concave-convex portions, or the like, in the overlap area therebetween, and the concave-convex portions of the first and second lead-out parts 121a and 122a, and 121a' and 122a' alternate with each other. The overlap area in the exposed portions of the lead-out parts may be reduced due to the concave-convex portions as described above, and thus defects due to lateral displacement between the internal electrodes at the time of cutting, or the like, may be prevented.

The first and second external electrodes 131 and 132 may be electrically connected to the first and second lead-out parts 121a and 122a, respectively. The first external electrode 131 may be connected to a portion of the first lead-out part 121a that is not overlapped with the second lead-out part 122a, and the second external electrode 132 may be connected to a portion of the second lead-out part 122a that is not overlapped with the first lead-out part 121a.

The insulating layer 140 may be formed between the first and second external electrodes 131 and 132 on the first surface 1 of the ceramic body 110. The insulating layer 140 may be formed to cover the portions of the first and second lead-out parts 121a and 122a exposed to the first surface 1 of the ceramic body 110, and as necessary, the insulating layer 140 may cover the entirety of the overlap area between the first and second lead-out parts 121a and 122a.

In addition, the insulating layer 140 may be formed on the first surface 1 of the ceramic body 110 while completely filling an interval between the first and second external electrodes 131 and 132. However, the present invention is not limited thereto. The insulating layer 140 may only cover the overlap area between the first and second lead-out parts 121a and 122a and be spaced apart from the first and second external electrodes 131 and 132 by a predetermined interval.

The insulating layer 140 formed as described above may serve to prevent short circuits between the first and second internal electrodes 121 and 122 and the first and second external electrodes 131 and 132 and prevent internal defects such as deterioration in resistance to moisture, or the like.

Figure 8:
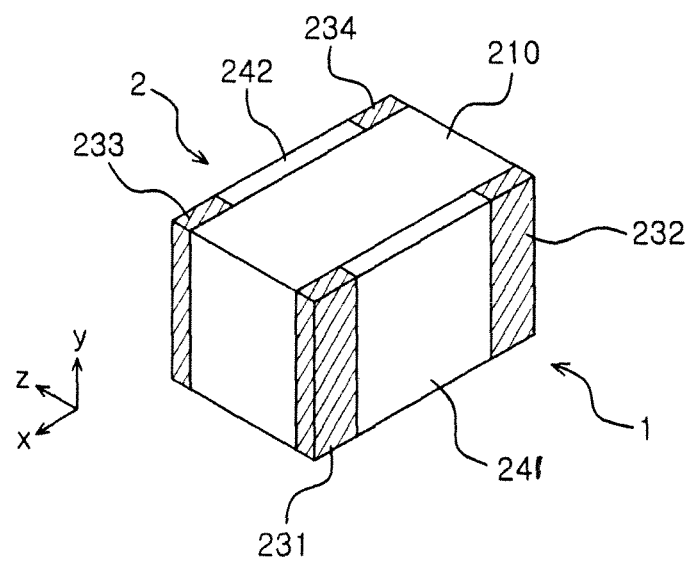
FIG. 8 is a transparent perspective view schematically showing a multilayer ceramic capacitor according to another embodiment of the present invention.
Figure 9:
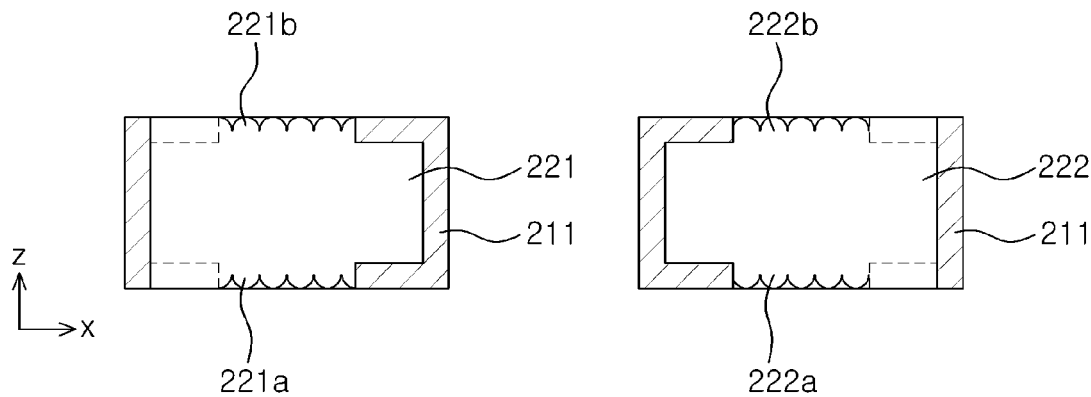
FIG. 9 is a transversal cross-sectional view showing first and second internal electrodes of the multilayer ceramic capacitor of FIG. 8.

FIG. 8 is a transparent perspective view schematically showing a multilayer ceramic capacitor according to another embodiment of the present invention; FIG. 9 is a transversal cross-sectional view showing first and second internal electrodes of the multilayer ceramic capacitor of FIG. 8; and FIG.

10 is a transversal cross-sectional view showing a structure in which first and second external electrodes and first and second insulating layers are formed on the first and second internal electrodes of FIG. 8. Hereinafter, components different from the components in the above-mentioned embodiment will be mainly described, and a detailed description of the same components will be omitted.

Figure 10:
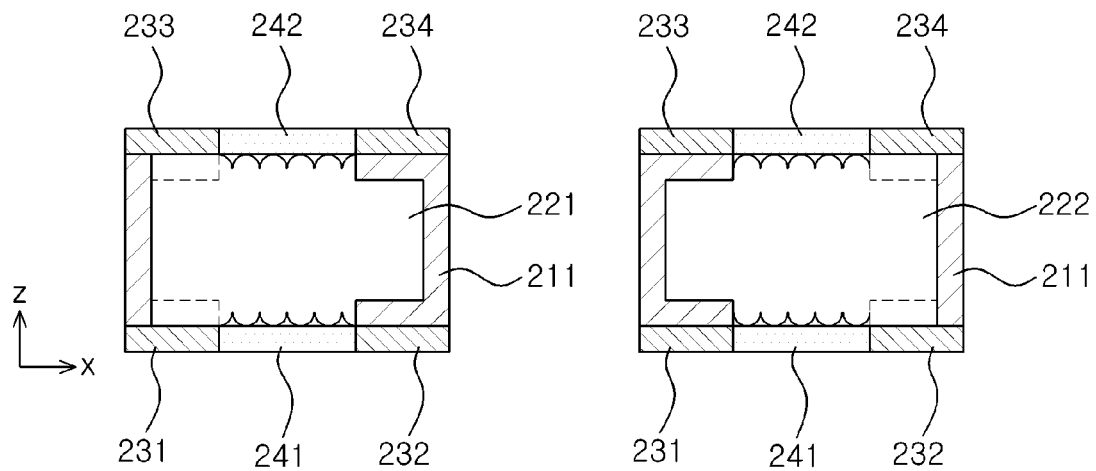
FIG. 10 is a transversal cross-sectional view showing a structure in which first and second external electrodes and first and second insulating layers are formed on the first and second internal electrodes of FIG. 8.

Referring to FIGS. 8 through 10, in the multilayer ceramic capacitor according to the present embodiment, a first internal electrode 221 having a first polarity and a second internal electrode 222 having a second polarity may be for riled in pair and be disposed to face each other in the y-direction, having the dielectric layer 211 interposed therebetween.

The first and second internal electrodes 221 and 222 may include first and third lead-out parts 221a and 221b, and second and fourth lead-out parts 222a and 222b in order to be connected to first and second external electrodes 231 and 232 having different polarities and third and fourth external electrodes 233 and 234 having different polarities, respectively.

In this case, the third and fourth lead-out parts 221b and 222b may be formed to have anyone of various concave-convex portions, such as triangular concave-convex portions, trapezoidal concave-convex portions, semicircular concave-convex portions, or the like, in the overlap area therebetween, and the concave-convex portions of the third and fourth lead-out parts 221b and 222b alternate with each other. The overlap area in the exposed portions of the lead-out parts may be reduced due to the concave-convex portions as described above, and thus defects due to lateral displacement between the internal electrodes at the time of cutting, or the like, may be prevented.

The first and second lead-out parts 221a and 222a of the first and second internal electrodes 221 and 222 may be exposed to a first surface 1 of a ceramic body 210, and the exposed portions thereof may be partially overlapped with each other. In addition, the third and fourth lead-out parts 221b and 222b of the first and second internal electrodes 221 and 222 may be exposed to a second surface 2 of the ceramic body 210, opposing the first surface 1, and the exposed portions thereof may be partially overlapped with each other.

In views disposed leftward of FIGS. 9 and 10, the first internal electrode 221 that is not overlapped with the second internal electrode 222 is represented by a dotted line, and in views disposed rightward of FIGS. 9 and 10, the second internal electrode 222 that is not overlapped with the first internal electrode 221 is represented by a dotted line.

The first and second external electrodes 231 and 232 may be formed on the first surface 1 of the ceramic body 210 so as to be connected to the first and second lead-out parts 221a and 222a, respectively.

A first insulating layer 241 may be formed on the first surface 1 of the ceramic body 210 so as to cover the first and second lead-out parts 221a and 222a and the first and second external electrodes 231 and 232. The first insulating layer 241 may cover the entirety of the overlap area between the first and second lead-out parts 221a and 222a.

A second insulating layer 242 may be formed on the second surface 2 of the ceramic body 210 so as to cover the third and fourth lead-out parts 221b and 222b and the third and fourth external electrodes 233 and 234. The second insulating layer 242 may cover the entirety of the overlap area between the third and fourth lead-out parts 221b and 222b.

In the embodiment of the present invention, the terms "first" and "second" may be used to define components having different polarities, and the terms "first" and "third" and the terms "second" and "fourth" may be used to define components having the same polarity.

Hereinafter, a method of manufacturing a multilayer ceramic capacitor according to an embodiment of the present invention will be described.

First, a plurality of first and second ceramic sheets may be prepared.

The first and second ceramic sheets, which are used to form dielectric layers 111 of a ceramic body 110, may be manufactured by mixing a ceramic powder, a polymer, and a solvent to prepare slurry and manufacturing the slurry as a sheet having a thickness of several μm by a doctor blade method, or the like.

The ceramic powder may include a barium titanate ($BaTiO_3$) based material. However, the present invention is not limited thereto. For example, the ceramic powder may include $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$ in which $BaTiO_3$ is used with Ca, Zr, or the like.

The slurry may be prepared by mixing a ceramic additive, an organic solvent, a plasticizer, a binder, and a dispersant with this ceramic powder material using a basket mill.

Next, first and second internal electrodes 121 and 122 may be formed by printing a conductive paste of a predetermined thickness on at least one surface of the first and second ceramic sheets.

Here, the first internal electrode 121 may include two or more first lead-out parts so as to be exposed to one surface of the first ceramic sheet, and in this case, two or more external electrodes may be formed so as to correspond thereto.

The first and second internal electrodes 121 and 122 may be formed to allow first and second lead-out parts 121a and 122a to be exposed to one surface of the first and second ceramic sheets, and the first and second lead-out parts 121a and 122a may have an overlap area.

In this case, the first and second lead-out parts 121a and 122a may be formed to have concave-convex portions, such as triangular concave-convex portions, trapezoidal concave-convex portions, semicircular concave-convex portions, or the like, in the overlap area therebetween. Here, the concave-convex portions of the first and second lead-out parts 121a and 122a alternate with each other.

As a printing method of the conductive paste, a screen printing method, a gravure printing method, or the like, may be used, and the conductive paste may include a metal powder, a ceramic powder, a silica ($SiO_2$) powder, or the like.

Then, the plurality of first and second ceramic sheets including the first and second internal electrodes 121 and 122 formed thereon are alternately stacked and pressed in a stacking direction, thereby compressing the first and second ceramic sheets and the first and second internal electrodes 121 and 122 with each other. Through the above-mentioned process, a stacked body in which the plurality of dielectric layers 111 and the plurality of first and second internal electrodes 121 and 122 are alternately stacked may be formed.

Next, the stacked body may be cut per each multilayer ceramic capacitor to be formed as a chip, and the cut chip is plasticized and sintered at a high temperature, followed by polishing the sintered chip, whereby the ceramic body 110 having the first and second internal electrodes 121 and 122 is manufactured.

In this case, the first and second lead-out parts 121a and 122a of the first and second internal electrodes 121 and 122 are formed to have the concave-convex portions, such that the overlap area in the exposed portions of the first and second lead-out parts 121a and 122a may be reduced, thereby preventing defects due to lateral displacement between the internal electrodes at the time of cutting, or the like.

Then, first and second external electrodes 131 and 132 are formed on the first surface 1 of the ceramic body 110 so as to contact the exposed portions of the first and second lead-out parts 121a and 122a to thereby be electrically connected to the first and second lead-out parts, respectively.

The first external electrode 131 may be formed to be vertically elongated in a thickness direction of the ceramic body 110 on a portion of the first surface 1 of the ceramic body 110 where the first lead-out part 121a is not overlapped with the second lead-out part 122a. The second external electrode 132 may be formed to be vertically elongated in the thickness direction of the ceramic body 110 on a portion of the first surface 1 of the ceramic body 110 where the second lead-out part 122a is not overlapped with the first lead-out part 121a.

In the above-described configuration, the first surface 1 of the ceramic body 110 may be a mounting surface when being mounted on a substrate, or the like.

Next, a first insulating layer 140 may be formed by applying ceramic slurry so as to cover the entirety of the exposed portions of the first and second lead-out parts 121a and 122a exposed to the first surface 1 of the ceramic body 110. As a slurry application method, for example, a spray method, a roller method, or the like may be used, but the present invention is not limited thereto.

As set forth above, according to embodiments of the present invention, an overlap area between first and second internal electrodes is increased and both first and second lead-out parts are exposed to one surface of the ceramic body, whereby the capacitance of the capacitor may be increased, and a lower surface thereof may be a mounting surface.

In addition, an overlap area in the exposed portions of the first and second lead-out parts is reduced to thereby prevent defects due to lateral displacement between the internal electrodes at the time of cutting, or the like, whereby a possibility of short circuits can be reduced and the reliability of the capacitor can be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
a ceramic body in which a plurality of dielectric layers are stacked;
a plurality of first and second internal electrodes alternately formed on the plurality of dielectric layers and including first and second lead-out parts having an overlap area exposed to one surface of the ceramic body, respectively;
first and second external electrodes formed on one surface of the ceramic body and electrically connected to the first and second lead-out parts, respectively; and
a first insulating layer formed on one surface of the ceramic body to cover exposed portions of the first and second lead-out parts,
wherein the first and second lead-out parts are formed to have concave-convex portions only alternating with each other in the overlap area,
a length of a main part of the first internal electrodes is greater than a sum of a length of the concave-convex portion of the first lead-out part and a length of the rest of the first lead-out part not formed to have a concave-convex portion, and
a length of a main part of the second internal electrodes is greater than a sum of a width of the concave-convex portion of the second lead-out part and a length of the rest of the second lead-out part not formed to have a concave-convex portion.

2. The multilayer ceramic capacitor of claim 1, wherein the concave-convex portions in the overlap area between the first and second lead-out parts are one of triangular concave-convex portions, trapezoidal concave-convex portions, and semicircular concave-convex portions.

3. The multilayer ceramic capacitor of claim 1, wherein a length of the overlap area between the first and second lead-out parts is 5% to 85% of a length of the ceramic body.

4. The multilayer ceramic capacitor of claim 1, wherein the first insulating layer is formed on one surface of the ceramic body to entirely cover the exposed portions of the first and second lead-out parts.

5. The multilayer ceramic capacitor of claim 1, wherein the first and second internal electrodes have third and fourth lead-out parts exposed to the other surface of the ceramic body opposing one surface of the ceramic body, respectively,
the third and fourth lead-out parts have an overlap area, and
the third and fourth lead-out parts are formed to have concave-convex portions alternating with each other in the overlap area therebetween.

6. The multilayer ceramic capacitor of claim 5, wherein the concave-convex portions in the overlap area between the third and fourth lead-out parts are one of triangular concave-convex portions, trapezoidal concave-convex portions, and semicircular concave-convex portions.

7. The multilayer ceramic capacitor of claim 5, wherein a length of the overlap area between the third and fourth lead-out parts is 5% to 85% of a length of the ceramic body.

8. The multilayer ceramic capacitor of claim 5, wherein the other surface of the ceramic body is provided with a second insulating layer so as to entirely cover exposed portions of the third and fourth lead-out parts.

9. A method of manufacturing a multilayer ceramic capacitor, the method comprising:
forming a first internal electrode on a first ceramic sheet while allowing a first lead-out part to be exposed to one surface of the first ceramic sheet;
forming a second internal electrode on a second ceramic sheet while allowing a second lead-out part having an overlap area with the first lead-out part to be exposed to one surface of the second ceramic sheet;
forming a ceramic body by alternately stacking a plurality of first and second ceramic sheets having the first and second internal electrodes formed thereon and sintering the stacked sheets;
forming first and second external electrodes on one surface of the ceramic body so as to be electrically connected to the first and second lead-out parts, respectively; and
forming a first insulating layer on one surface of the ceramic body so as to cover exposed portions of the first and second lead-out parts,
wherein the first and second lead-out parts are formed to have respective concave-convex portions only alternating with each other in the overlap area,
a length of a main part of the first internal electrode is greater than a sum of a length of the concave-convex portion of the first lead-out part and a length of the rest of the first lead-out part not formed to have a concave-convex portion, and a length of a main part of the second internal electrode is greater than a sum of a width of the concave-convex portion of the second lead-out part and a length of the rest of the second lead-out part not formed to have a concave-convex portion.

10. The method of claim 9, wherein in the forming of the first and second internal electrodes, the concave-convex portions in the overlap area between the first and second lead-out parts are one of triangular concave-convex portions, trapezoidal concave-convex portions, and semicircular concave-convex portions.

11. The method of claim 9, wherein in the forming of the first insulating layer, the first insulating layer is formed by applying ceramic slurry to one surface of the ceramic body so as to entirely cover the exposed portions of the first and second lead-out parts.

12. The method of claim 9, wherein in the forming of the first and second internal electrodes, the first and second internal electrodes have third and fourth lead-out parts exposed to the other surface of the ceramic body opposing one surface of the ceramic body, respectively, the third and fourth lead-out parts have an overlap area, and the third and fourth lead-out parts are formed to have concave-convex portions alternating with each other in the overlap area therebetween.

13. The method of claim 12, wherein the concave-convex portions in the overlap area between the third and fourth lead-out parts are one of triangular concave-convex portions, trapezoidal concave-convex portions, and semicircular concave-convex portions.

14. The method of claim 12, further comprising forming a second insulating layer on the other surface of the ceramic body so as to entirely cover exposed portions of the third and fourth lead-out parts.

15. The method of claim 14, wherein in the forming of the second insulating layer, the second insulating layer is formed by applying ceramic slurry to the other surface of the ceramic body so as to entirely cover the exposed portions of the third and fourth lead-out parts.

* * * * *